United States Patent [19]
Storey et al.

[11] Patent Number: 5,670,738
[45] Date of Patent: Sep. 23, 1997

[54] HYBRID INFLATOR WITH POP-OUT DIFFUSER

[75] Inventors: J. Kirk Storey, Farmington; Brent K. Olson, Clearfield, both of Utah

[73] Assignee: Morton International. Inc., Chicago, Ill.

[21] Appl. No.: 694,202

[22] Filed: Aug. 8, 1996

[51] Int. Cl.⁶ .................... C06D 5/00; B60R 21/26
[52] U.S. Cl. .................. 102/530; 222/3; 280/737; 280/741
[58] Field of Search .................. 102/530, 531; 137/68.21; 222/3; 239/204; 280/736, 737, 740, 741, 742; 422/164

[56] References Cited

U.S. PATENT DOCUMENTS

| | | | |
|---|---|---|---|
| 3,797,853 | 3/1974 | Grosch et al. | 280/150 AB |
| 3,960,390 | 6/1976 | Goetz | 280/731 |
| 5,184,846 | 2/1993 | Goetz | 280/736 |
| 5,195,777 | 3/1993 | Cuevas | 280/736 |
| 5,226,668 | 7/1993 | Delonge-Immik et al. | 280/737 |
| 5,234,229 | 8/1993 | Gordon | 280/736 |
| 5,257,817 | 11/1993 | Cuevas | 280/736 |
| 5,301,978 | 4/1994 | Munzel et al. | 280/737 |
| 5,378,018 | 1/1995 | Ketterer et al. | 280/737 |
| 5,423,570 | 6/1995 | Kort et al. | 280/736 |
| 5,437,472 | 8/1995 | Kuretake et al. | 280/737 |
| 5,456,492 | 10/1995 | Smith et al. | 280/737 |
| 5,480,185 | 1/1996 | Lowe et al. | 280/740 |
| 5,494,314 | 2/1996 | Kriska et al. | 280/740 |
| 5,511,818 | 4/1996 | Jarboe et al. | 280/728.2 |
| 5,516,147 | 5/1996 | Clark et al. | 280/737 |
| 5,536,039 | 7/1996 | Cuevas | 280/737 |

FOREIGN PATENT DOCUMENTS

| | | | |
|---|---|---|---|
| 2443267 | 3/1975 | Germany | B60R 21/10 |
| 2265118 | 9/1993 | United Kingdom | B60R 21/16 |

Primary Examiner—Harold J. Tudor
Attorney, Agent, or Firm—George W. Rauchfuss, Jr.; Gerald K. White

[57] ABSTRACT

A hybrid inflator including an inflator housing having an outer wall and a pop-out diffuser. The outer wall defines a compressed gas reservoir and contains a combustion chamber separated from the compressed gas reservoir by a rupturable burst diaphragm. An initiator and pyrotechnic gas generant are contained within the combustion chamber of the inflator housing. The initiator is connectable to a remote collision or deceleration sensor through an initiator port defined by the outer wall. Compressed inert gas is contained within the compressed gas reservoir. The pop-out diffuser includes a diffuser plate forming a unitary part of the outer wall and a rupturable seam divides the diffuser plate from the remainder of the outer wall. A diffuser sleeve extends from the diffuser plate into the compressed gas reservoir to a diffuser flange extending radially outwardly from the diffuser sleeve and having an outer diameter that is greater than an outer diameter of the diffuser plate. The diffuser sleeve defines a plurality of gas exhaust ports. Upon initiation of the inflator, the initiator ignites the pyrotechnic gas generant which burst through the rupturable burst diaphragm to heat the compressed inert gas. The heated compressed inert gas pressurizes and causes the rupturable seam of the diffuser plate to rupture and form a portal so that the pop-out diffuser will extends out of the outer wall through the portal. The compressed inert gas can then exit the inflator through the gas exhaust ports of the diffuser sleeve and be dispersed for inflating an inflatable airbag cushion.

16 Claims, 2 Drawing Sheets

HYBRID INFLATOR WITH POP-OUT DIFFUSER

FIELD OF THE INVENTION

The present invention relates to an inflator for use as part of an airbag module and, more particularly, to a hybrid inflator having a pop-out diffuser.

BACKGROUND OF THE INVENTION

An airbag module is employed in an automobile for protecting an occupant against injury by deploying an inflated airbag cushion to physically restrain the occupant's body when the automobile encounters a collision. An inflator produces inflation gas for inflating the airbag cushion.

Some existing inflators are of the hybrid type that produce inflation gas from a combination of stored compressed inert gas and pyrotechnic gas generant which are separated within an inflator housing of the inflator by a first burst diaphragm. Upon initiation of the hybrid inflator, an initiator ignites the pyrotechnic gas generant which creates a hot gas/particulate effluent which ruptures the burst diaphragm and heats the compressed gas.

The inflator housing includes a diffuser normally fixed to a wall of the housing over an outlet opening defined by the wall. The diffuser defines at least one gas exhaust port, and is separated from the compressed gas by a second burst diaphragm. As the compressed gas is heated the pressure within the inflator housing rises until the second burst diaphragm is ruptured, allowing the heated compressed gas to rapidly exit the inflator through the gas exhaust ports of the diffuser to inflate an airbag cushion of the airbag module.

A problem, however, is that fragments of the ruptured second diaphragm can partially block the gas exhaust ports of the diffuser and disrupt the designed flow of the heated compressed gas into the airbag cushion. To prevent blockage of the gas exhaust ports, many hybrid inflator include cleaning filters for filtering the gas flow. In addition, because the diffuser extends outwardly from the hybrid inflator, the inflator is awkward to install and awkward to package and ship prior to installation, and the overall size of the airbag module is increased.

Thus there is a need to improve hybrid inflators by eliminating or minimizing the foregoing drawbacks of present devices.

SUMMARY OF THE INVENTION

A general object, therefore, of the present invention is to provide a new and improved hybrid inflator for use with an airbag module.

A more specific object of the present invention is to provide a new and improved inflator housing for a hybrid inflator.

Another object of the present invention is to provide a new and improved diffuser for an inflator housing.

An additional object of the present invention is to provide a diffuser that does not require a burst diaphragm positioned between the diffuser and stored compressed gas of a hybrid inflator, to reduce the chance of the diffuser being blocked by fragments of the burst diaphragm and obviate the need for a cleaning filter in the diffuser.

A further object of the present invention is to provide a diffuser that does not substantially extend outwardly from a hybrid inflator prior to initiation of the hybrid inflator, to simplify the installation of the hybrid inflator and the packaging and shipping of the hybrid inflator prior to installation in an airbag module, and to provide more space within an airbag module for packing an airbag cushion.

Still another object of the present invention is to provide a hybrid inflator including a simplified diffuser having fewer parts.

In carrying out this invention, there is provided an inflator housing including an outer wall defining a compressed gas reservoir, and a pop-out diffuser. The pop-out diffuser includes a diffuser plate forming a unitary part of the outer wall, a rupturable seam dividing the diffuser plate from the remainder of the outer wall, and a diffuser sleeve extending from the diffuser plate into the compressed gas reservoir to a diffuser flange. The diffuser flange extends radially outwardly from the diffuser sleeve and has an outer diameter greater than an outer diameter of the diffuser plate, and the diffuser sleeve defines a plurality of gas exhaust ports. The inflator housing is for use as part of a hybrid inflator. Upon initiation of the hybrid inflator, the diffuser rupture seam will rupture and form a portal in the outer wall so that the diffuser can extend out of the inflator and diffuse inflation gas for inflating an airbag cushion.

According to one aspect of the present invention, the outer wall includes an elongated, generally cylindrical sidewall extending from a first end to a second end. A first endwall closes the first end of the cylindrical sidewall and defines an initiator port, and a combustion housing extends from the first endwall to within the cylindrical sidewall. The combustion housing internally defines a combustion chamber extending from the initiator port and communicating with the compressed gas reservoir through an inlet port defined by the combustion housing, and a rupturable burst diaphragm seals the inlet port. A second endwall closes the second end of the cylindrical sidewall, and the diffuser plate of the pop-out diffuser forms part of the second endwall with the diffuser sleeve extending to within the cylindrical sidewall.

According to another aspect of the present invention, the inflator housing further comprises a generally cylindrical center tie having an upper end and a lower end. The center tie defines a combustion chamber extending axially inwardly from the lower end, and a diffuser cavity extending axially inwardly from the upper end. The outer wall of the inflator housing includes an upwardly facing concave bottom wall secured to the lower end of the central tie and defining an initiator port providing access to the combustion chamber. A downwardly facing concave top wall is secured to the upper end of the central tie, with an outer edge of the top wall secured to an outer edge of the bottom wall so that the center tie, the top wall and the bottom wall define the compressed gas reservoir. The diffuser plate of the pop-out diffuser forms part of the top wall covering the diffuser cavity, with the diffuser sleeve extending into the diffuser cavity. The center tie also defines an inlet port connecting the combustion chamber with the compressed gas reservoir and an outlet port connecting the compressed gas reservoir with the diffuser cavity, with a rupturable burst diaphragm sealing the inlet port.

A hybrid inflator according to the present invention is also provided and includes an inflator housing as described above. The inflator housing further has a combustion chamber separated from the compressed gas reservoir by a rupturable burst diaphragm. The hybrid inflator also includes compressed inert gas contained within the compressed gas reservoir of the inflator housing, and an initiator and pyrotechnic gas generant contained within the combustion chamber of the inflator housing. The initiator is operable by a remote collision sensor through an initiator port defined by the outer wall providing access to the combustion chamber.

The present invention, therefore, provides a new and improved hybrid inflator for an airbag module and, more particularly, provides a new and improved inflator housing for a hybrid inflator. Even more particularly, the present invention provides a pop-out diffuser for a hybrid inflator. The pop-out diffuser is relatively simple and has fewer parts than many existing diffusers. In addition, the pop-out diffuser does not extend outwardly from the hybrid inflator prior to initiation of the hybrid inflator, thereby providing more space within an airbag module for packing an airbag cushion. Furthermore, the pop-out diffuser does not require a burst diaphragm positioned between the diffuser and the compressed gas reservoir of the hybrid inflator, reducing the chance of the diffuser becoming blocked by fragments of the burst diaphragm upon initiation of the inflator and reducing the need for a cleaning filter in the diffuser.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
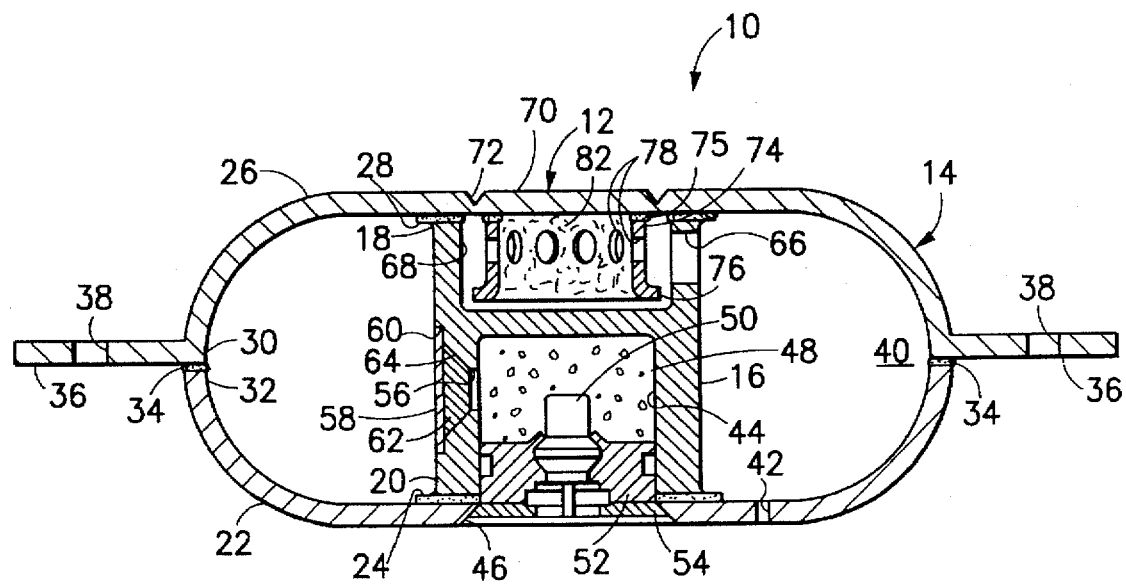
FIG. 1 is a side sectional view of a hybrid inflator including a pop-out diffuser according to the present invention.
Figure 2:
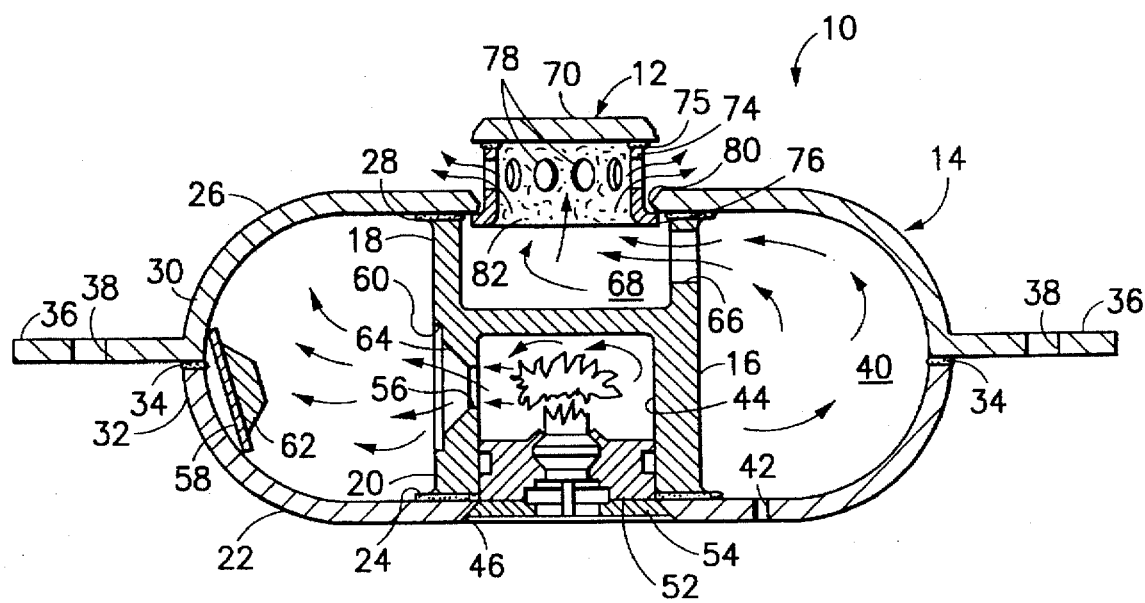
FIG. 2 is a side sectional view of the hybrid inflator of FIG. 1 showing the pop-out diffuser extended after initiation of the hybrid inflator.

A hybrid inflator 10 including a pop-out diffuser 12 according to the present invention is illustrated in FIGS. 1 and 2. The hybrid inflator 10 is similar to a hybrid inflator having a tortuous delivery passage shown and described in U.S. Pat. No. 5,423,570 which is assigned to the assignee of the present invention and incorporated herein by reference. The hybrid inflator 10 is for use as part of an airbag module, typically a driver side airbag module, and is for providing inflation gas for inflating an airbag cushion of airbag module as is known in the art. The pop-out diffuser 12 according to the present invention remains stored within the inflator 10 prior to initiation of the inflator, as shown in FIG. 1. Upon initiation of the inflator 10, rapidly increased pressure within the inflator causes the pop-out diffuser 12 to pop out or extend out of the inflator as shown in FIG. 2, to allow inflation gases created within the inflator to exit and be dispersed through the pop-out diffuser.

The hybrid inflator 10 includes a metal inflator housing 14 having a generally cylindrical center tie 16 having an outwardly flanged upper end 18 and an outwardly flanged lower end 20. An upwardly facing concave bottom wall 22 is secured to the lower end 20 of the central tie 16 by weld 24, and a downwardly facing concave top wall 26 is secured to the upper end 18 of the central tie by weld 28. An outer edge 30 of the top wall 26 is secured to an outer edge 32 of the bottom wall 22 by weld 34, and an inflator flange 36 extends radially outwardly from the outer edge of the top wall and defines a plurality of spaced-apart mounting holes 38 for mounting the hybrid inflator 10.

The top wall 26, the bottom wall 22 and the center tie 16 together define a toroidal compressed gas reservoir 40 surrounding the center tie. The compressed gas reservoir 40 is filled with an inert gas, such as argon or nitrogen, at pressure in the range of 2,000 to 4,000 psi., and the gas is sealed in the compressed gas reservoir as described below until operation of the hybrid inflator 10. The gas is introduced into the compressed gas reservoir 40 through a fill port 42, which is then welded shut.

The center tie 16 defines a combustion chamber 44 which extends axially inwardly from the lower end 20 of the center tie, and the bottom wall 22 defines an initiator port 46 providing access to the combustion chamber. The combustion chamber 44 contains a pyrotechnic heat source material 48 generally comprised of boron potassium nitrate ($BKNO_3$) or other suitable pyrotechnic which produces hot gases used to heat the stored gas. The combustion chamber 44 and pyrotechnic heat source material 48 contained therein is further provided with an initiator squib 50 mounted in a cylindrical plug 52 which seals the combustion chamber at the lower end 20 of the center tie 16. The plug 52 and the squib 50 are secured in position by a beveled plate 54 which is welded to the bottom wall 22.

The center tie 16 defines an inlet port 56 extending from the combustion chamber 44 into the compressed gas reservoir 40. Prior to operation of the hybrid inflator 10, the compressed gas reservoir 40 is sealed from the combustion chamber 44 by a thin metal rupturable burst diaphragm 58 welded about its perimeter to a stepped portion 60 of the inlet port 56. The diaphragm 58 is backed by a solid plug 62 received in a chamfered seat 64 of the inlet port 56, thereby providing support against the gas pressure for the thin diaphragm. The center tie 16 further defines an outlet port 66 adjacent the upper end 18 thereof leading to a diffuser chamber 68 which extends axially inwardly from the upper end of the center tie. The outlet port 66 is aligned with and diametrically opposed to the inlet port 56 to provide a tortuous flow path as described below.

The pop-out diffuser 12 includes a circular diffuser plate 70 formed as a unitary part of the top wall 26. The diffuser plate 70 is surrounded by a diffuser rupture seam 72 in alignment with the diffuser chamber 68 of the center tie 16 and separating the diffuser plate from the remainder of the top wall 26. The diffuser rupture seam 72 is in the form of a notch or a thinned outline in the top wall 26 designed to give or break once a predetermined level of pressure is reached within the compressed gas reservoir 40. A cylindrical diffuser sleeve 74 is secured to the diffuser plate 70 with weld 75, and extends downwardly into the diffuser chamber 68 to a radially outwardly extending, continuous diffuser flange 76. The diffuser flange 76 has an outside diameter that is larger than the diameter of the diffuser plate 70. The diffuser sleeve 74 is provided with a plurality of evenly spaced-apart diffuser exhaust ports 78.

The hybrid inflator 10 functions in the following manner. In response to a signal indicative of a vehicle crash, a control signal is communicated to the initiator squib 50, which is activated. Upon activation, the initiator squib 50 fires, igniting the pyrotechnic heat source material 48. As pressure in the combustion chamber 44 rises and exceeds the pressure within the compressed gas reservoir 40 and the strength of the rupturable burst diaphragm 58, the plug 62 is unseated and the burst diaphragm ruptures. Hot gas and hot particles from the burning pyrotechnic heat source material 48 and initiator squib 50 flow through the inlet port 56 into the compressed gas reservoir 40, heating the compressed inert gas and causing a rapid pressure rise in the reservoir. When the pressure in the compressed gas reservoir 40 exceeds the structural capability of the diffuser rupture seam 72, the diffuser rupture seam ruptures and a portal 80 in the shape of the rupture seam is formed in the top wall 26, allowing the diffuser plate 70 and diffuser sleeve 74 to pop out and extend above of the top wall of the inflator housing 14 through the portal. The operating pressure of the hybrid inflator 10 can vary depending upon many factors including the size of the inflator and the operating conditions. The structural capability of the diffuser rupture seam 72 can be accordingly adjusted by varying the depth and width of the rupture seam. Because the diffuser flange 76 has an outside diameter that is larger than a diameter of the diffuser plate 70 and portal 80, the diffuser flange engages a peripheral portion of the top wall 26 around the portal and prevents the pop-out diffuser 12 from being ejected from the inflator 10. The diffuser flange 76 does not have to be continuous as long as it can not fit through the portal 80. The heated, compressed inert gas is then able to exit the inflator 10 and be diffused through the diffuser gas exhaust ports 78 of the pop-out diffuser 12 to inflate an airbag cushion (not shown, but common in the art). The diffuser gas exhaust ports 78 collectively have less area than the outlet port 66, whereby the gas exhaust ports throttle the flow of gas from the inflator 10 and provide a desired fill rate into an airbag cushion. Thus, the fill rate can be adjusted as desired for particular airbag structures by varying the diameter and/or number of the gas exhaust ports 78.

The flow path from the combustion chamber 44 to the diffuser gas exhaust ports 78 is tortuous and thereby prevents or substantially minimizes hot particles exiting the inflator 10, as is described in detail in U.S. Pat. No. 5,423,570. A cleaning and/or cooling filter 82 may be provided within the diffuser sleeve 74, if desired and as known in the art; however, only a lightweight filter is required, if at all.

Figure 3:
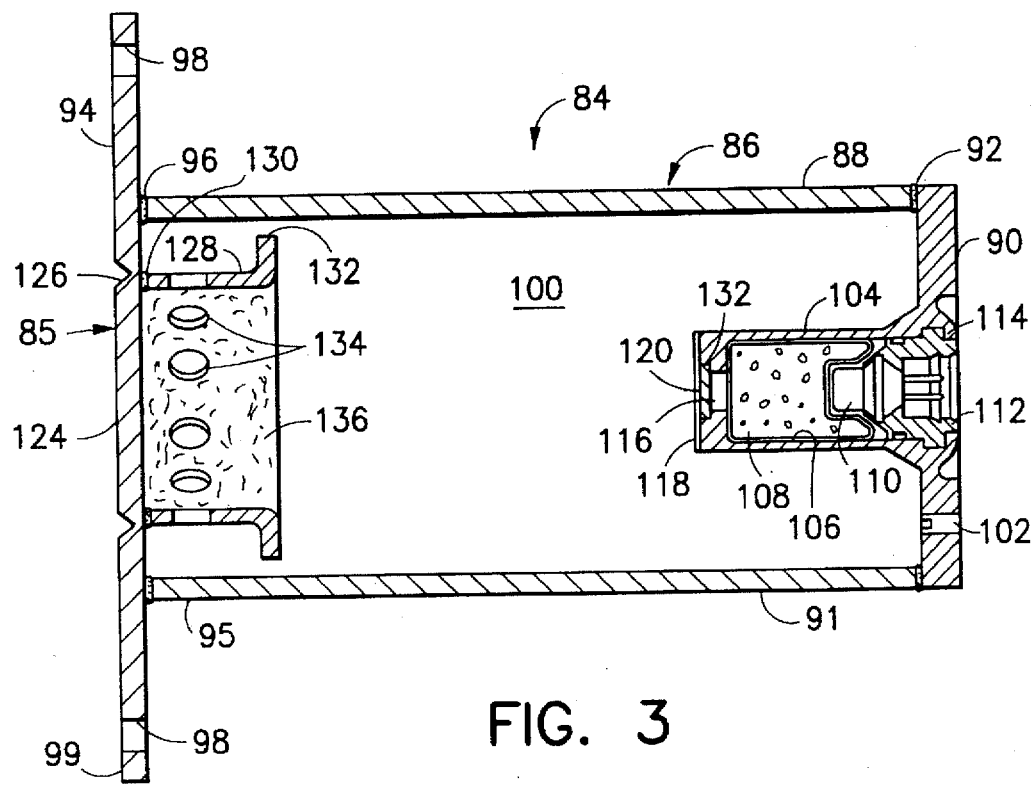
FIG. 3 is a side sectional view of another hybrid inflator including a pop-out diffuser according to the present invention.
Figure 4:
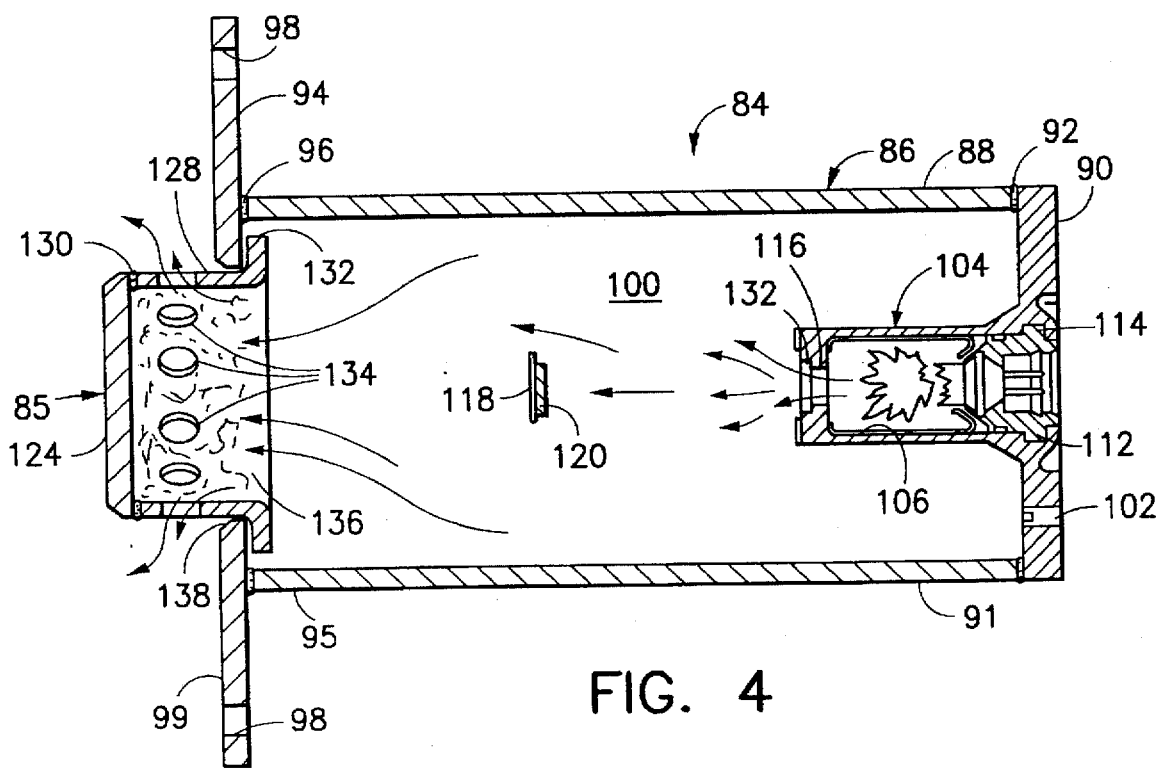
FIG. 4 is a side sectional view of the hybrid inflator of FIG. 3 showing the pop-out diffuser extended after initiation of the hybrid inflator.

Referring now to FIGS. 3 and 4, another hybrid inflator 84 also having a pop-out diffuser 85 according to the present invention is shown. This type of elongated hybrid inflator 84 is typically used in passenger-side airbag modules. The hybrid inflator 84 includes an inflator housing 86 having an elongated, generally cylindrical sidewall 88 extending from a first end 91 to a second end 95. A first endwall 90 closes the first end 91 of the cylindrical sidewall 88 and is secured to the sidewall with weld 92, and a second endwall 94 closes the second end 95 of the cylindrical sidewall and is secured to the sidewall with weld 96. A portion 99 of the second endwall 94 also extends radially outwardly from the sidewall 88 and defines a plurality of spaced-apart mounting holes 98 to provide a mounting plate for mounting the hybrid inflator 84 within an airbag module. The first endwall 90, the sidewall 88 and the second endwall 94 define a compressed gas reservoir 100 filled with an inert gas, such as argon or nitrogen, at pressure in the range of 2,000 to 4,000 psi., until the gas is sealed in the reservoir, as described below, during operation of the hybrid inflator 84. The inert gas is introduced through a fill port 102, which is then welded shut.

The first endwall 90 includes a combustion housing 104 defining a combustion chamber 106 which extends axially inwardly into the compressed gas reservoir 100. The combustion chamber 106 contains a pyrotechnic heat source material 108 generally comprised of boron potassium nitrate ($BKNO_3$) or other suitable pyrotechnic which produces hot gases used to heat the compressed inert gas. The combustion chamber 106 and pyrotechnic heat source material 108 contained therein is further provided with an initiator squib 110 mounted in a cylindrical plug 112 which seals the combustion chamber at the first endwall 90. The plug 112 and the squib 110 are secured in position by a circumferential crimp 114 formed in the first endwall 90. The combustion housing 104 defines an inlet port 116 extending from the combustion chamber 106 into the compressed gas reservoir 100. Prior to operation of the hybrid inflator 84, the compressed gas reservoir 100 is sealed from the combustion chamber 106 by a thin metal rupturable burst diaphragm 118 welded about its perimeter to the combustion housing 104 and backed by a solid plug 120 received in a stepped seat 122 of the inlet port 116, thereby providing support against the gas pressure for the thin burst diaphragm.

The pop-out diffuser 85 includes a circular diffuser plate 124 formed as a unitary part of the second endwall 94. The diffuser plate 124 is surrounded by a diffuser rupture seam 126 separating the diffuser plate from the remainder of the second endwall 94. A cylindrical diffuser sleeve 128 is secured to the diffuser plate 124 with weld 139, and extends downwardly to a radially outwardly extending, continuous diffuser flange 132. The diffuser flange 132 has an outside diameter that is larger than the diameter of the diffuser plate 124. The diffuser sleeve 128 is provided with a plurality of evenly spaced-apart gas exhaust ports 134. A cleaning and/or cooling filter 136 can be provided within the diffuser sleeve 128 if desired.

Upon initiation of the hybrid inflator 84, the initiator squib 110 is activated and ignites the pyrotechnic heat source material 108. As pressure in the combustion chamber 106 rises and exceeds the pressure within the compressed gas reservoir 100 and the strength of the rupturable burst diaphragm 118, the plug 120 is unseated and the burst diaphragm ruptures. Hot gas and hot particles from the burning pyrotechnic heat source material 108 and initiator squib 110 flow through the inlet port 116 into the compressed gas reservoir 100, heating the compressed inert gas and causing a rapid pressure rise in the reservoir. When the pressure in the compressed gas reservoir 100 exceeds the structural capability of the diffuser rupture seam 126, the diffuser rupture seam ruptures and a portal 138 in the shape of the rupture seam is formed in the second endwall 94, allowing the diffuser plate 124 and diffuser sleeve 128 to pop out or extend out of the second endwall of the inflator housing 86 through the portal. Because the diffuser flange 132 has an outside diameter that is larger than the diameter of the diffuser plate 124 and portal 138, the diffuser flange engages a peripheral portion of the second endwall 94 around the portal and prevents the pop-out diffuser 85 from being ejected from the inflator 84. The heated, compressed inert gas is then able to exit the inflator 84 and be diffused through the gas exhaust ports 134 of the pop-out diffuser 85 to inflate an airbag cushion (not shown, but common in the art). The gas exhaust ports 134 throttle the flow of gas from the inflator 84 and provide a desired fill rate into an airbag cushion, which can be adjusted as desired for particular airbag structures by varying the diameter and/or number of the gas exhaust ports.

The present invention, therefore, provides a new and improved hybrid inflator for an airbag module and, more particularly, provides a new and improved inflator housing for a hybrid inflator. Even more particularly, the present invention provides a pop-out diffuser for a hybrid inflator. The pop-out diffuser is relatively simple and has fewer parts than many existing diffusers. In addition, the pop-out diffuser does not extend outwardly from the hybrid inflator prior to initiation of the hybrid inflator, thereby providing more space within an airbag module for packing an airbag cushion. Furthermore, the pop-out diffuser does not require a burst diaphragm positioned between the diffuser and the compressed gas reservoir of the hybrid inflator, reducing the chance of the diffuser becoming blocked by fragments of the burst diaphragm upon initiation of the inflator and reducing the need for a cleaning filter in the diffuser.

Accordingly, the preferred embodiment of the hybrid inflator has been described which admirably achieves the objects of the invention herein. With reference to the description of the preferred embodiment, those skilled in the art will appreciate that modifications may be made without departing from the spirit of the invention. Therefore, it is not intended that the scope of the invention be limited to the specific embodiment illustrated and described. Rather, it is intended that the scope of the invention be determined by the appended claims and equivalents thereof.

We claim:

1. An inflator housing for use as part of a hybrid inflator, the housing comprising:
   A) an outer wall defining a compressed gas reservoir;
   B) a pop-out diffuser including;
      1) a diffuser plate forming a unitary part of the outer wall,
      2) a rupturable seam dividing the diffuser plate from the outer wall, and
      3) a diffuser sleeve extending from the diffuser plate into the compressed gas reservoir to a diffuser flange extending radially outwardly from the diffuser sleeve, the diffuser flange having an outer diameter greater than an outer diameter of the diffuser plate, the diffuser sleeve defining a plurality of gas exhaust ports.

2. An inflator housing as defined in claim 1 wherein the outer wall comprises:
   1) an elongated, generally cylindrical sidewall extending from a first end to a second end;
   2) a first endwall closing the first end of the cylindrical sidewall and defining an initiator port, a combustion housing extending from the first endwall to within the cylindrical sidewall, the combustion housing internally defining a combustion chamber extending from the initiator port and communicating with the compressed gas reservoir through an inlet port defined by the combustion housing, a rupturable burst diaphragm sealing the inlet port; and
   3) a second endwall closing the second end of the cylindrical sidewall, the diffuser plate of the pop-out diffuser forming part of the second endwall with the diffuser sleeve extending to within the cylindrical sidewall.

3. An inflator housing as defined in claim 2 wherein a portion of the second endwall extends radially outwardly from the cylindrical sidewall of the inflator housing and defines a plurality of spaced-apart mounting holes.

4. An inflator housing as defined in claim 1 further comprising a generally cylindrical center tie having an upper end and a lower end, the center tie defining a combustion chamber extending axially inwardly from the lower end, and a diffuser cavity extending axially inwardly from the upper end, and wherein the outer wall includes:
   1) an upwardly facing concave bottom wall secured to the lower end of the central tie and defining an initiator port providing access to the combustion chamber;
   2) a downwardly facing concave top wall secured to the upper end of the central tie, with an outer edge of the top wall secured to an outer edge of the bottom wall so that the center tie, the top wall and the bottom wall define the compressed gas reservoir, the diffuser plate of the pop-out diffuser forming part of the top wall covering the diffuser cavity, with the diffuser sleeve extending into the diffuser cavity; and
   3) the center tie defining an inlet port connecting the combustion chamber with the compressed gas reservoir and an outlet port connecting the compressed gas reservoir with the diffuser cavity, with a rupturable burst diaphragm sealing the inlet port.

5. An inflator housing as defined in claim 4 wherein the outlet port is substantially diametrically opposed to the inlet port defined by the center tie.

6. An inflator housing as defined in claim 4 further comprising an inflator flange extending radially outwardly from the outer edge of the top wall and defining a plurality of spaced-apart mounting holes.

7. An inflator housing as defined in claim 1 wherein the diffuser sleeve of the pop-out diffuser contains filter material.

8. An inflator housing as defined in claim 1 wherein the diffuser flange is continuous.

9. A hybrid inflator comprising:
   A) an inflator housing including
      1) an outer wall defining a compressed gas reservoir and containing a combustion chamber separated from the compressed gas reservoir by a rupturable burst diaphragm, the outer wall defining an initiator port providing access to the combustion chamber, and
      2) a pop-out diffuser including;
         a) a diffuser plate forming a unitary part of the outer wall,
         b) a rupturable seam dividing the diffuser plate from the remainder of the outer wall, and
         c) a diffuser sleeve extending from the diffuser plate into the compressed gas reservoir to a diffuser flange extending radially outwardly from the diffuser sleeve, the diffuser flange having an outer diameter greater than an outer diameter of the diffuser plate, the diffuser sleeve defining a plurality of gas exhaust ports;
   B) compressed inert gas contained within the compressed gas reservoir of the inflator housing; and
   C) an initiator and pyrotechnic gas generant contained within the combustion chamber of the inflator housing, the initiator operable by a remote collision sensor through the initiator port defined by the outer wall.

10. A hybrid inflator as defined in claim 9 wherein the outer wall of the inflator housing comprises:
   1) an elongated, generally cylindrical sidewall extending from a first end to a second end;
   2) a first endwall closing the first end of the cylindrical sidewall and defining the initiator port, a combustion housing extending from the first endwall to within the cylindrical sidewall, the combustion housing internally defining the combustion chamber extending from the initiator port and communicating with the compressed gas reservoir through an inlet port defined by the combustion housing, the rupturable burst diaphragm sealing the inlet port; and
   3) a second endwall closing the second end of the cylindrical sidewall, the diffuser plate of the pop-out diffuser forming part of the second endwall with the diffuser sleeve extending to within the cylindrical sidewall.

11. A hybrid inflator as defined in claim 10 wherein a portion of the second endwall of the inflator housing extends radially outwardly from the cylindrical sidewall of the inflator housing and defines a plurality of spaced-apart mounting holes.

12. A hybrid inflator as defined in claim 9 further comprising a generally cylindrical center tie having an upper end and a lower end, the center tie defining the combustion chamber extending axially inwardly from the lower end, and a diffuser cavity extending axially inwardly from the upper end, and wherein the outer wall includes:

1) an upwardly facing concave bottom wall secured to the lower end of the central tie and defining the initiator port, 2) a downwardly facing concave top wall secured to the upper end of the central tie, with an outer edge of the top wall secured to an outer edge of the bottom wall so that the center tie, the top wall and the bottom wall define the compressed gas reservoir, the diffuser plate of the pop-out diffuser forming part of the top wall covering the diffuser cavity, with the diffuser sleeve extending into the diffuser cavity; and 3) the center tie defining an inlet port connecting the combustion chamber with the compressed gas reservoir and an outlet port connecting the compressed gas reservoir with the diffuser cavity, with the rupturable burst diaphragm sealing the inlet port.

13. A hybrid inflator as defined in claim 12 wherein the outlet port is generally diametrically opposed to the inlet port defined by the center tie of the inflator housing.

14. A hybrid inflator as defined in claim 12 wherein the inflator housing further comprises an inflator flange extending radially outwardly from the outer edge of the top wall and defining a plurality of spaced-apart mounting holes.

15. A hybrid inflator as defined in claim 9 wherein the diffuser sleeve of the pop-out diffuser contains filter material.

16. A hybrid inflator as defined in claim 9 wherein the diffuser flange is continuous.

* * * * *